US 9,946,862 B2

(12) United States Patent
Yun et al.

(10) Patent No.: US 9,946,862 B2
(45) Date of Patent: Apr. 17, 2018

(54) ELECTRONIC DEVICE GENERATING NOTIFICATION BASED ON CONTEXT DATA IN RESPONSE TO SPEECH PHRASE FROM USER

(71) Applicant: QUALCOMM Incorporated, San Diego, CA (US)

(72) Inventors: Sungrack Yun, Seongnam (KR); Taesu Kim, Suwon (KR); Sungwoong Kim, Seoul (KR); Heeman Kim, Seongnam (KR)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/956,180

(22) Filed: Dec. 1, 2015

(65) Prior Publication Data
US 2017/0154176 A1 Jun. 1, 2017

(51) Int. Cl.
G10L 15/00 (2013.01)
G10L 17/00 (2013.01)
G10L 21/00 (2013.01)
G06F 21/32 (2013.01)
G06F 3/16 (2006.01)
G10L 15/22 (2006.01)
H04M 1/67 (2006.01)
H04M 1/725 (2006.01)

(52) U.S. Cl.
CPC ............ *G06F 21/32* (2013.01); *G06F 3/167* (2013.01); *G10L 15/22* (2013.01); *H04M 1/67* (2013.01); *G10L 2015/223* (2013.01); *G10L 2015/228* (2013.01); *H04M 1/72569* (2013.01)

(58) Field of Classification Search
None
See application file for complete search history.

(56) References Cited

U.S. PATENT DOCUMENTS

| 8,731,929 | B2* | 5/2014 | Kennewick | ............. G10L 15/22 |
| | | | | 704/246 |
| 8,938,394 | B1* | 1/2015 | Faaborg | .................. G06F 3/167 |
| | | | | 704/270 |
| 9,076,125 | B2* | 7/2015 | Manolescu | ............. G06Q 10/10 |
| 9,430,186 | B2* | 8/2016 | Faaborg | .................. G06F 3/167 |

(Continued)

FOREIGN PATENT DOCUMENTS

WO      2014165470 A1    10/2014

OTHER PUBLICATIONS

International Search Report and Written Opinion—PCT/US2016/058920—ISA/EPO—dated Dec. 19, 2016.

(Continued)

*Primary Examiner* — Satwant Singh
(74) *Attorney, Agent, or Firm* — Toler Law Group, P.C.

(57) ABSTRACT

A method for generating a notification by an electronic device to alert a user of the electronic device is disclosed. In this method, a speech phrase may be received. Then, the received speech phrase may be recognized, by a processor, as a command to generate the notification. In addition, one or more context data of the electronic device may be detected by at least one sensor. It may be determined whether the notification is to be generated at least based on the context data. The notification may be generated, by the processor, based on the context data and the command to generate the notification.

30 Claims, 11 Drawing Sheets

(56) References Cited

U.S. PATENT DOCUMENTS

| | | |
|---|---|---|
| 2004/0193420 A1 | 9/2004 | Kennewick |
| 2010/0145702 A1* | 6/2010 | Karmarkar ............. H04L 51/38 704/258 |
| 2012/0258701 A1 | 10/2012 | Walker et al. |
| 2012/0319984 A1* | 12/2012 | Borovsky ........... G06F 3/04883 345/173 |
| 2013/0324071 A1* | 12/2013 | Huh ....................... H04W 4/22 455/404.1 |
| 2014/0253319 A1 | 9/2014 | Chang |
| 2014/0282003 A1 | 9/2014 | Gruber et al. |
| 2014/0330435 A1* | 11/2014 | Stoner ................... F24F 11/001 700/275 |
| 2014/0368339 A1 | 12/2014 | Thaker et al. |
| 2015/0302855 A1 | 10/2015 | Kim et al. |
| 2015/0378431 A1* | 12/2015 | Donaldson ................ G06T 7/73 382/103 |
| 2016/0170991 A1* | 6/2016 | Birchall ............. G06F 17/3053 707/751 |
| 2016/0335052 A1* | 11/2016 | Faaborg .................. G06F 3/167 |
| 2016/0378080 A1* | 12/2016 | Uppala ................... G10L 15/22 700/275 |

OTHER PUBLICATIONS

AppzCloud Technologies, "PhoneFinder—Find your lost phone by Shouting in Microphone," Retrieved date on Mar. 26, 2015, Retrieved from the Internet URL: https://itunes.apple.com/us/app/phonefinder-find-your-lost/id917633269?mt=8 , 3 Pages.

Nickinson P., "Testing the voice-activated 'find my phone' feature on the Moto X," Android Central, Oct. 29, 2013, Retrieved date on Aug. 25, 2015, Retrieved from the Internet URL: http://www.androidcentral.com/testingvoiceactivatedfindmyphonefeaturemotox , 7 pages.

* cited by examiner

ELECTRONIC DEVICE GENERATING NOTIFICATION BASED ON CONTEXT DATA IN RESPONSE TO SPEECH PHRASE FROM USER

FIELD OF THE DISCLOSURE

The present disclosure relates to generating a notification by an electronic device, and more specifically, to generating a notification to alert a user of the electronic device.

DESCRIPTION OF RELATED ART

Recently, the use of electronic devices such as smartphones, tablet computers, wearable computers, and the like has become widespread. These devices often provide voice and/or data communication functionalities over wireless or wired networks. In addition, such devices may provide a variety of functions designed to enhance user convenience such as sound processing, image or video processing, navigation, reproduction of music or multimedia files, etc.

Among such functions, conventional electronic devices are often equipped with a speech recognition function. Such electronic devices may perform a function in response to receiving and recognizing a voice command from a user. For example, an electronic device equipped with a speech recognition function may activate an application, play an audio file, or take a picture in response to a voice command from a user.

Occasionally, electronic devices may be lost or misplaced by their users. In such cases, some conventional electronic devices are configured to output an alarm sound or a message to assist the users in finding the electronic devices. For example, an electronic device may alert a user of its location by generating an alarm sound in response to a voice command from the user. The electronic device may also transmit a message to another electronic device of the user to inform the user of the location of the electronic device.

In some situations, however, alarm sounds may be generated erroneously. For example, if a voice command to find an electronic device is received by a user's electronic device from another person intended for his or her own electronic device, the user's electronic device may generate an alarm sound in response to the voice command. Further, using audio functions of electronic devices in some locations such as a library, a theater, a meeting room, and the like may be restricted or limited. In such an environment, generating an alarm sound for locating an electronic device in response to a voice command from the user or another person may be undesirable.

SUMMARY OF THE INVENTION

The present disclosure relates to generating a notification to alert a user of the electronic device based on context data of the electronic device and a command to generate the notification.

According to one aspect of the present disclosure, a method for generating a notification by an electronic device to alert a user of the electronic device is disclosed. In this method, a speech phrase may be received. Then, the received speech phrase may be recognized, by a processor, as a command to generate the notification. In addition, one or more context data of the electronic device may be detected by at least one sensor. It may be determined whether the notification is to be generated at least based on the context data. The notification may be generated, by the processor, based on the context data and the command to generate the notification. The disclosure also describes a computer-readable medium relating to this method.

According to another aspect of the present disclosure, an electronic device for generating a notification to alert a user of the electronic device is disclosed. The electronic device may include a sound sensor, a speech recognition unit, a sensor unit, a processor, and an output unit. The sound sensor may be configured to receive a speech phrase, and the speech recognition unit may be configured to recognize the speech phrase as a command to generate the notification. In addition, the sensor unit may be configured to detect context data of the electronic device. Further, the processor may be configured to generate the notification based on the context data and the command. The output unit may be configured to generate at least one of audible sound, vibration, or visible light indicative of the notification. Additionally, the processor may include a notification processing unit, which is configured to determine whether the notification is to be generated based on the context data.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspects of this disclosure may be practiced without these specific details. In other instances, well-known methods, procedures, systems, and components have not been described in detail so as not to unnecessarily obscure aspects of the various embodiments.

Figure 1:
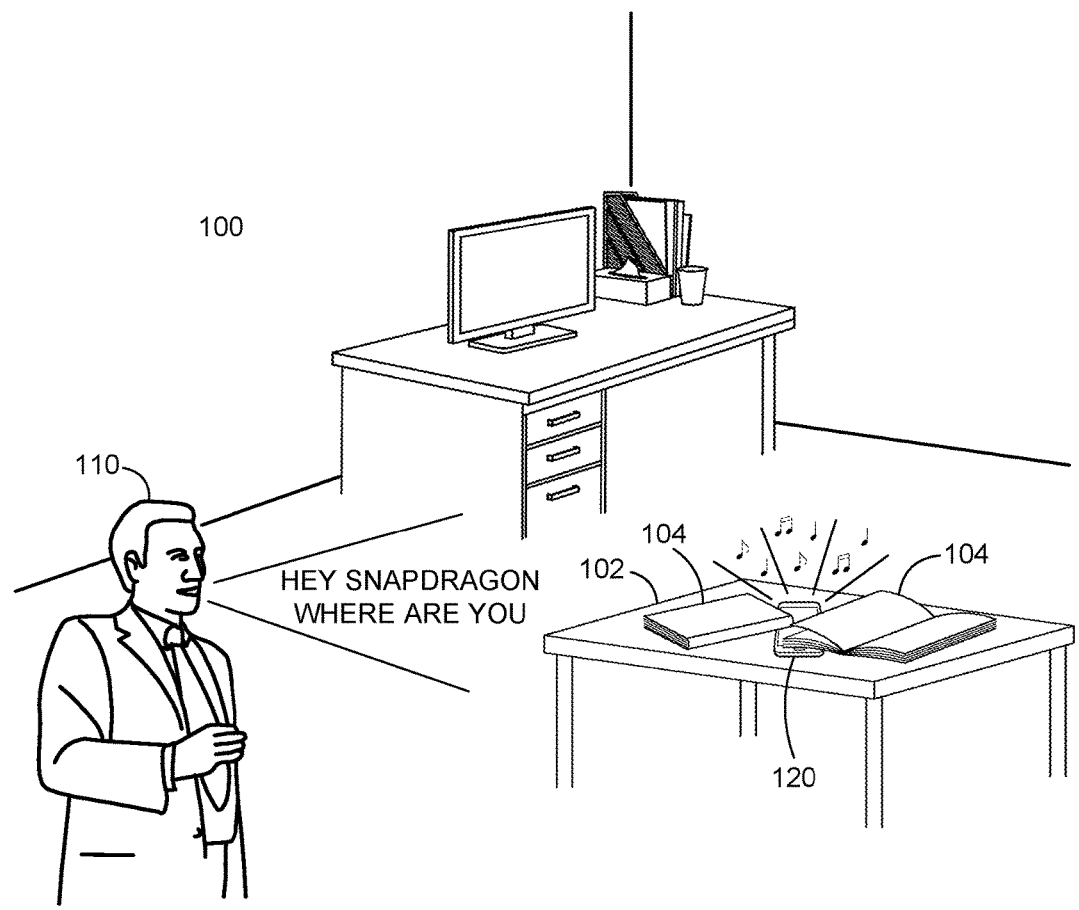
FIG. 1 illustrates an electronic device configured to generate a notification to alert a user of the electronic device based on context data of the electronic device, according to one embodiment of the present disclosure.

FIG. 1 illustrates an electronic device 120 configured to generate a notification to alert a user 110 of the electronic device 120 based on context data of the electronic device 120, according to one embodiment of the present disclosure. As shown, the user 110 and the electronic device 120 may be located in a room 100. The electronic device may be placed on a desk 102 and covered by a plurality of books 104, so that the user 110 may not be able to find the electronic device 120. As illustrated herein, the electronic device 120 may be any suitable device adapted to receive and process sounds such as a smartphone, a digital camera, a wearable computer (e.g., smart glasses, a smart watch, etc.), a personal computer, a laptop computer, a tablet computer, a gaming device, etc.

To locate the electronic device 120, the user 110 may speak a speech phrase indicative of a command to generate the notification to alert the user 110 of the electronic device 120. The electronic device 120 may receive the speech phrase from the user 110 via a sound sensor 130 in the electronic device 120. The speech phrase may be one or more predetermined keywords and/or one or more natural language phrases, as will be described in more detail below with reference to FIG. 8. Upon receiving the speech phrase, the electronic device 120 may recognize the speech phrase as the command to generate the notification.

Upon recognizing the speech phrase as the command to generate the notification, the electronic device 120 may detect context data of the electronic device 120. As used herein, the term "context data" of an electronic device may be any data or information describing or characterizing an environmental condition of the electronic device such as an ambient light level, an ambient sound level, a current time, a current location, etc. of the electronic device, and usage data indicative of whether the electronic device 120 is being used by the user 110 such as data indicative of a movement of the electronic device, an image of the user 110, a user input (e.g., a key input, a touch input, a speech input, etc.) detected by the electronic device, an event indicative of an unacknowledged incoming communication, and/or an input sound (e.g., a speech command) spoken in a direction other than a direction toward the electronic device.

Based on the context data and the command to generate the notification, the electronic device 120 may generate the notification. In one embodiment, the electronic device 120 may determine whether the notification is to be generated based on the context data and the command to generate the notification. Upon determining that the notification is to be generated, the electronic device 120 may generate and output the notification adapted to alert the user 110 of the electronic device 120. The notification may be output using any suitable output units such as a speaker, a vibrating unit, a light output unit (e.g., a display screen, an LED flash, etc.), a communication unit, and the like that may provide an output indicative of a location or presence of the electronic device 120 and allow the user 110 to find or locate the electronic device 120.

On the other hand, the electronic device 120 may determine that the notification is not to be generated based on the context data of the electronic device 120. For example, if the context data indicates that the electronic device 120 is being used by the user 110 or is located in a library, the electronic device 120 may determine that the notification is not to be generated. In this case, even when the electronic device 120 has recognized the speech phrase as the command to generate the notification, the notification may not be generated. In this manner, generation of the notification may be controlled based on the context data of the electronic device 120 to prevent an undesired or inadvertent notification from being generated and output.

Figure 2:
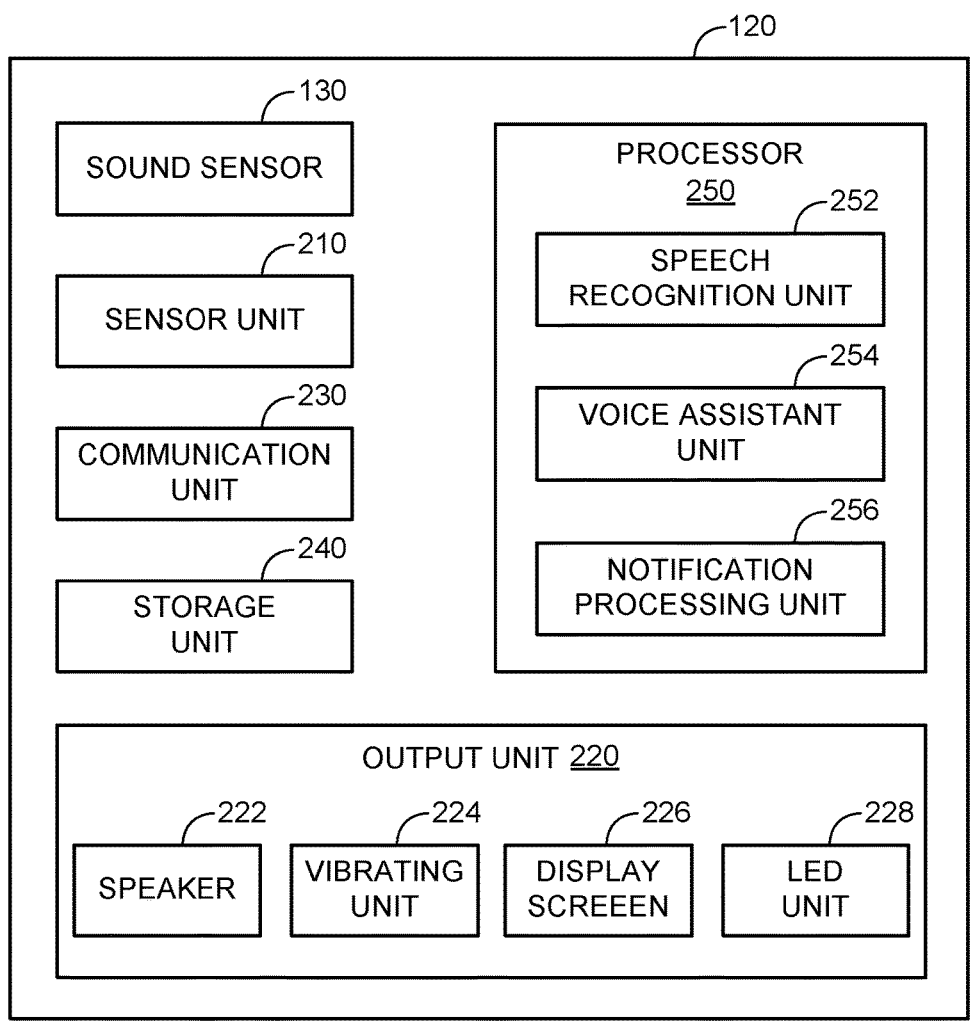
FIG. 2 illustrates a block diagram of the electronic device configured to generate a notification for the user based on context data of the electronic device, according to one embodiment of the present disclosure.

FIG. 2 illustrates a block diagram of the electronic device 120 configured to generate a notification for the user 110 based on context data of the electronic device 120, according to one embodiment of the present disclosure. The electronic device 120 may include a sound sensor 130, a sensor unit 210, an output unit 220, a communication unit 230, storage unit 240 and a processor 250. The processor 250 may include a speech recognition unit 252, a voice assistant unit 254, and a notification processing unit 256. The processor 250 may be any suitable processor for managing and operating the electronic device 120, such as an application processor (AP), central processing unit (CPU), digital signal processor (DSP), etc. The sound sensor 130 may be a separate component from the sensor unit 210 or may be included in the sensor unit 210, and may be any suitable device capable of receiving sound and converting the sound into electronic signals indicative of the sound. As used herein, the term "unit" may refer to one or more hardware components, sections, parts, or circuitry capable of performing or adapted to perform one or more functions and may additionally perform such functions in conjunction with or by executing processes, instructions, procedures, subroutines, or the like (e.g., program code, microcode, etc.). In turn, a "unit" may be segmented into smaller units (e.g., sub-units) or two or more units may be combined into a single "unit."

In the electronic device 120, the sound sensor 130 may be configured to receive a speech phrase from the user 110. Upon receiving the speech phrase, the sound sensor 130 may provide the speech phrase to the speech recognition unit 252 of the processor 250. The speech recognition unit 252 in the processor 250 may be configured to recognize the speech phrase as a command to perform a function such as a command to generate the notification using any suitable speech recognition schemes such as Hidden Markov Model, Deep Neural Networks, or the like. Once the speech phrase is recognized as the command to generate the notification, the speech recognition unit 252 may provide the command to generate the notification to the notification processing unit 256 in the processor 250. In this case, the notification processing unit 256 may be in a deactivated state and may be activated by the speech recognition unit 252 upon recognizing the command to generate the notification. Alternatively, the notification processing unit 256 may already be activated for receiving the command to generate the notification from the speech recognition unit 252.

According to some embodiments, the speech phrase may include at least a first speech phrase and a second speech phrase, each of which may be a predetermined keyword or a phrase. For example, the speech recognition unit 252 may recognize the first phrase (e.g., "Hey Snapdragon") and activate the voice assistant unit 254 in the processor 250. The voice assistant unit 254 may then receive the second speech phrase (e.g., "Where are you?") via the sound sensor 130 and recognize the second speech phrase as a command to generate a notification. Upon recognizing the second speech phrase, the voice assistant unit 254 may activate the notification processing unit 256 and provide the recognized command to generate the notification to the notification processing unit 256.

In the electronic device 120, the sensor unit 210 may include any suitable number and types of sensors or devices capable of detecting context data of the electronic devices. For example, the sensor unit 210 may include a sound sensor (e.g., the sound sensor 130), an image sensor, a motion sensor, a clock unit, a location sensor, an input unit, and the like, as will be described in more detail with reference to FIG. 3. The sensor unit 210 may detect context data such as a user input, an image of the user 110, an environmental condition (e.g., location information, timing information, an ambient light value), a movement of the electronic device 120, an event indicative of an unacknowledged incoming communication, and/or an input sound (e.g., a speech command) spoken in a direction other than a direction toward the electronic device 120, and provide the context data to the notification processing unit 256. In one embodiment, the sensor unit 210 may be configured to monitor context data continuously, periodically, or intermittently. Additionally or alternatively, the sensor unit 210 may be configured to detect context data upon receiving and/or recognizing a speech phrase indicative of a command to generate the notification.

Upon receiving the command to generate the notification, the notification processing unit 256 may be configured to determine whether the notification is to be generated based on the context data received from the sensor unit 210 and/or the sound sensor 130. For example, if the context data indicates that the electronic device 120 is likely to be inaccessible to the user 110 (e.g., lost or misplaced), the notification processing unit 256 of the electronic device 120 may determine that the notification is to be generated. On the other hand, if the context data indicates that the electronic device 120 is located at a place such as in a library, a movie theater, etc., where the use of the electronic device 120 may be restricted, the notification processing unit 256 may determine that the notification is not to be generated.

The notification processing unit 256 may be configured to instruct the output unit 220 to generate the notification based on the context data and the recognized command to generate the notification. According to one embodiment, in response to determining that the notification is to be generated based on the context data, the notification processing unit 256 may generate one or more signals configured to control generation of the notification by the output unit 220. For example, the notification processing unit 256 may provide one or more signals to activate and/or instruct the output unit 220 to generate the notification upon determining that the notification is to be generated. On the other hand, the notification processing unit 256 may determine that the notification is not to be generated based on the context data. In this case, the notification processing unit 256 may not provide any signals to instruct the output unit 220 for generating the notification or may provide one or more signals to deactivate and/or instruct the output unit 220 to prevent generation of the notification. In this manner, the notification may not be output based on the context data even when the speech phrase received from the user 110 is recognized as a command to generate the notification.

The output unit 220 may be configured to generate the notification based on the context data and the command to generate the notification. As described herein, the output unit 220 may be any suitable component capable of outputting notification in response to one or more control signals from the notification processing unit 256. In one embodiment, the output unit 220 may include any one of a speaker 222, a vibrating unit 224, a display screen 226, an LED unit 228, etc., or any combination thereof. For example, the speaker 222 in the electronic device 120 may output an audible sound (e.g., an alarm sound, a ringtone, or the like) to assist the user 110 in finding the electronic device 120. Additionally or alternatively, the vibrating unit 224 may vibrate, or the display screen 226 or the LED unit 228 may output visible light. In an additional or alternative embodiment, the notification processing unit 256 may generate a notification (e.g., a message indicating a location of the electronic device, which may be obtained from a location sensor in the sensor unit 210), and transmit the notification to an external device associated with the user 110 via the communication unit 230.

The storage unit 240 in the electronic device 120 may store a command database (not shown) of one or more predetermined speech phrases for the electronic device 120 to generate the notification. The command database may be accessed by the speech recognition unit 252 and/or the voice assistant unit 254 in the processor 250 to recognize a received speech phrase as the command to generate the notification. In some embodiments, the storage unit 240 may store a context database (not shown), which may be accessed by the notification processing unit 256 in the processor 250 for use in determining whether the notification is to be generated based on the context data. The context database may be configured to store any suitable types of data or information that may be used for determining whether the notification is to be generated, such as a predetermined location where the notification is not to be generated, a predetermined time period during which the notification is not to be generated, and the like. In one embodiment, the context database may be updated based on context data received continuously, periodically, or intermittently by the sensor unit 210. The storage unit 240 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

Figure 3:
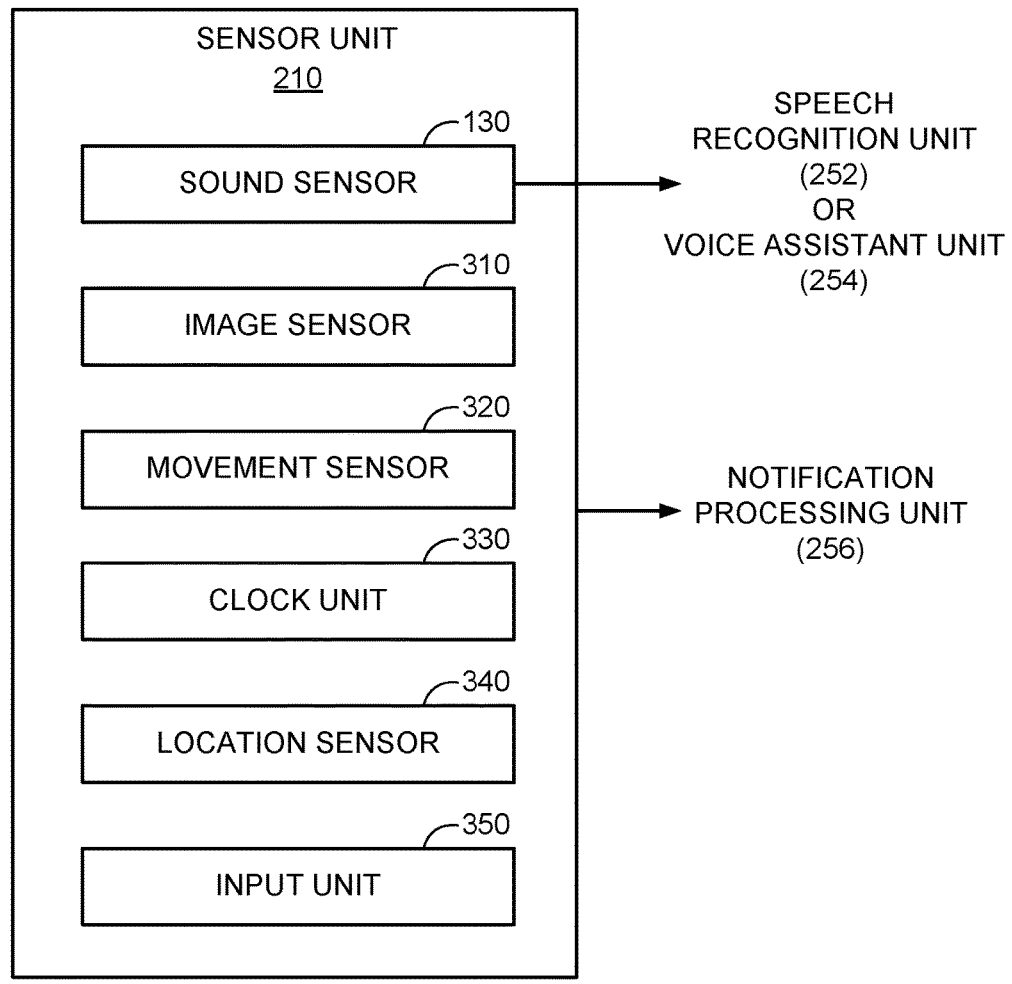
FIG. 3 illustrates a block diagram of the sensor unit configured to detect context data of the electronic device, according to one embodiment of the present disclosure.

FIG. 3 illustrates a block diagram of the sensor unit 210 configured to detect context data of the electronic device 120, according to one embodiment of the present disclosure. The sensor unit 210 may include a plurality of sensors such as a sound sensor 130, an image sensor 310, a movement sensor 320 (e.g., an accelerometer, a gyroscope, etc.), a clock unit 330, a location sensor 340, and an input unit 350 (e.g., a touch screen, a key or button, etc.). The sensors 130, 310, 320, 330, 340, and 350 may detect one or more inputs as context data, which may be provided to the notification processing unit 256 in the processor 250.

The sound sensor 130 may be configured to receive an input sound and convert the input sound into sound data, which may be output as context data to the notification processing unit 256. The sound sensor 130 may include one or more microphones or any other types of sound sensors that can be used to receive, capture, sense, and/or detect an input sound, and may employ any suitable software and/or hardware for performing such functions. In one embodiment, the sound sensor 130 may receive an input sound including a speech phrase spoken from the user 110. The input sound may also include an environmental sound of the electronic device 120 or from the user 110 such as background sound, noise, etc. As the input sound is received, the sound sensor 130 may generate sound data, which may be provided to the notification processing unit 256 as context data.

According to one embodiment, the sound sensor 130 may be also configured to receive a speech phrase as a command to generate a notification from the user 110 and provide the speech phrase to the speech recognition unit 252. In another embodiment, the speech phrase may include a first speech phrase and a second speech phrase. In this case, the sound sensor 130 may provide the first speech phrase to the speech recognition unit 252, which may activate the voice assistant unit 254 upon recognizing the first speech phrase as a command to activate the voice assistant unit 254. The voice assistant unit 254 may receive the second speech phrase from the sound sensor 130 and recognize the phrase as a command to generate the notification.

In the sensor unit 210, the image sensor 310 may be configured to capture one or more images such as a face, eyes, lips, or a hand of a user, etc. The images may also include a background image of the user or the electronic device 120. According to one embodiment, the image sensor 310 may capture an image of a face, an eye (e.g., iris), or any other physical images that can be used to identify a user. According to another embodiment, an ambient light level of the electronic device 120 may be detected by the image sensor 310. The image sensor 310 may then provide the images and/or the ambient light level as context data to the notification processing unit 256 in the processor 250. As described herein, the image sensor 310 may be any suitable image or light sensing device (e.g., a camera, a camera module, a charge-coupled device, etc.) capable of capturing or sensing an image or a light level.

The movement sensor 320 may be configured to detect a movement of the electronic device 120. In one embodiment, the movement sensor 320 may be a gyroscope and/or an accelerometer configured to monitor orientations and/or acceleration of the electronic device 120 and generate data indicative of a change in orientation or a motion of the electronic device 120. For example, the gyroscope may detect orientations of the electronic device 120 to track a motion or movement of the electronic device 120. On the other hand, the accelerometer may detect acceleration or orientations of the electronic device 120 to track a motion of the electronic device 120. The generated data indicative of a change in orientation or a motion of the electronic device 120 may be provided to the notification processing unit 256 as context data.

The clock unit 330 in the sensor unit 210 may be configured to detect timing information (e.g., a current time) of the electronic device 120 and output the detected timing information as context data. The clock unit 330 may be a timing device or clock embedded in the electronic device 120 and configured to track current time. Additionally or alternatively, the clock unit 330 may be implemented in the processor 250 as a CPU clock, receive timing information from an external network via the communication unit 230, or use GPS time information received via the location sensor 340 to keep track of the current time. The clock unit 330 may provide the timing information to the notification processing unit 256 as context data.

The location sensor 340 may be configured to detect location information (e.g., a current location) of the electronic device 120 and output the detected location information as context data. In one embodiment, the location sensor 340 may be a GPS receiver configured to detect GPS location information and timing information based on GPS signals received from a plurality of GPS satellites. Additionally or alternatively, the location sensor 340 may be a wireless receiver configured to receive signals from a plurality of Wi-Fi access points or cell tower base stations and detect location information of the electronic device 120. The location sensor 340 may then provide the location information, which may include a set of latitude, longitude, and altitude of the electronic device 120, to the notification processing unit 256 as context data.

The input unit 350 may be configured to detect an input from a user (e.g., a manual input) of the electronic device 120 and output the detected input as context data. In one embodiment, the input unit 350 may be any suitable input devices for receiving an input from a user (e.g., a user input) and may include a touch screen, a button, a keypad, a touchpad, or the like. The input unit 350 may provide the detected input from the user to the notification processing unit 256 as context data.

Figure 4:
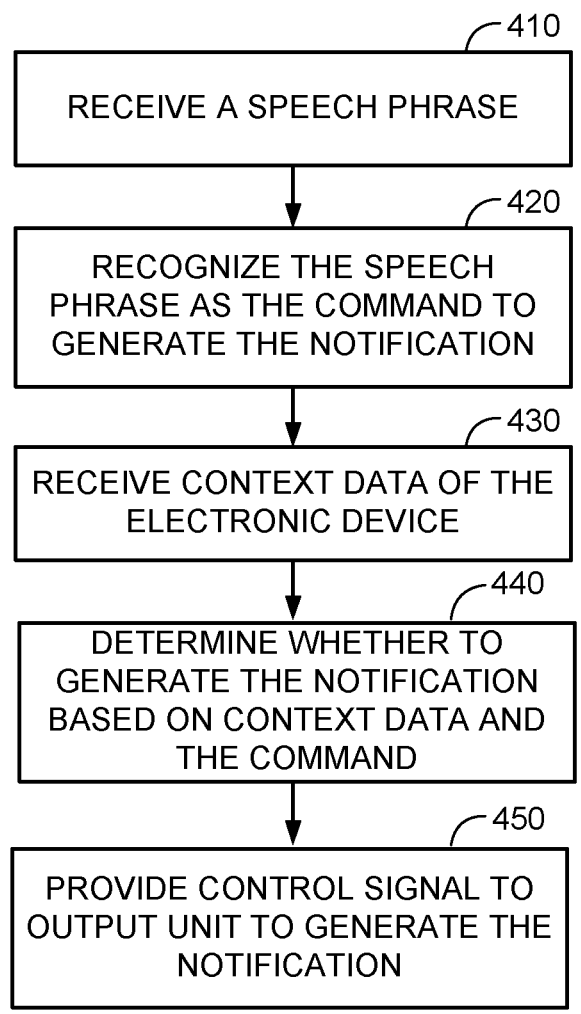
FIG. 4 illustrates a flow chart of a method performed by the processor in the electronic device for generating a notification based on context data of the electronic device, according to one embodiment of the present disclosure.

FIG. 4 illustrates a flow chart of a method performed by the processor 250 in the electronic device 120 for generating a notification based on context data of the electronic device 120, according to one embodiment of the present disclosure. Initially, the processor 250 may receive a speech phrase from the user via the sound sensor 130 at 410. In one embodiment, the speech recognition unit 252 in the processor 250 may recognize the received speech phrase as a command to generate the notification. Alternatively, the speech recognition unit 252 unit may receive a first speech phrase as a command to activate the voice assistant unit 254 via the sound sensor 130 and activate the voice assistant unit 254 upon recognizing the first speech phrase as the activation command. The voice assistant unit 254 may then receive the second speech phrase from the sound sensor 130 and recognize the phrase as the command to generate the notification. The command to generate the notification may then be provide to the notification processing unit 256.

In response to the command to generate the notification, the notification processing unit 256 may receive context data of the electronic device 120 from one or more sensors in the sensor unit 210 at 430. In one embodiment, the notification processing unit 256 may receive context data at least based on one among a user input, movement of the electronic device, timing information, location information of the electronic device, ambient light value, and an input sound. Additionally or alternatively, the processor 250 may also detect an event indicative of an unacknowledged incoming communication as context data. For example, the processor 250 may receive an incoming communication (e.g., a message, an email, etc.) via the communication unit 230 and store the incoming communication in the storage unit 240. Until the user 110 reviews the incoming communication, the processor 250 may determine that the incoming communication has not been acknowledged (e.g., reviewed) by the user 110 and thus detect the unacknowledged incoming communication as context data, which may be provided to the notification processing unit 256 in the processor 250. Additionally or alternatively, the sensor unit 210 may include a separate processing unit that may detect an event indicative of an unacknowledged incoming communication as context data.

At 440, the notification processing unit 256 may determine whether to generate the notification based on the context data and the command to generate the notification. In one embodiment, in response to the recognized command to generate the notification, the notification processing unit 256 may determine whether the notification is to be generated based on the context data. In this case, the notification processing unit 256 may analyze one or more context data from the sensor unit 210 and/or the processor 250 or any combination thereof, such as a user input, an image of the user 110, an environmental condition (e.g., location information, timing information, an ambient light value), a movement of the electronic device 120, an event indicative of an unacknowledged incoming communication, and/or an input sound (e.g., a speech command). In the case of the image of the user 110, the notification processing unit 256 may apply any suitable facial recognition techniques to identify the face of the user 110 in one or more images that may be received from the image sensor 310 in the sensor unit 210. In the case of the input sound, the notification processing unit 256 may determine whether the input sound is spoken in a direction other than a direction toward the electronic device 120, which may also be used as context data as will be described in more detail with reference to FIGS. 6 and 7.

The various types of context data may be processed by the notification processing unit 256 to determine whether to generate the notification as will be described in more detail with reference to FIG. 5. In one embodiment, one or more types of context data may be given a higher or highest priority so that the notification may be generated based on detecting such types of context data despite detecting other types of context data. Additionally or alternatively, a context score may be determined based on the various types of context data, each of which may be weighted and combined. Once the notification processing unit 256 determines that the notification is to be generated, it may provide a control signal to the output unit 220 to generate the notification at 450.

Upon receiving the control signal, the output unit 220 may output the notification via the speaker 222, the vibrating unit 224, the display screen 226, and/or the LED unit 228. For example, the speaker 222 in the output unit 220 may output an audible sound (e.g., an alarm sound, a ringtone, or the like). Additionally or alternatively, the vibrating unit 224 in the output unit 220 may vibrate, or visible light may be output via the display screen 226 or the LED unit 228.

According to one embodiment, the electronic device 120 may be configured to be in a silent mode in which the electronic device 120 may be configured to disable output of sound via the speaker 222. In this case, if the electronic device 120 determines that the notification is to be generated, it may deactivate the silent mode so that the notification may be output via the speaker 222. For example, if the electronic device 120 is in a vibrating mode in which vibration may be output via the vibrating unit 224 and output of sound via the speaker 222 is disabled, it may deactivate the vibrating mode to allow output of the notification via the speaker 222.

Figure 5:
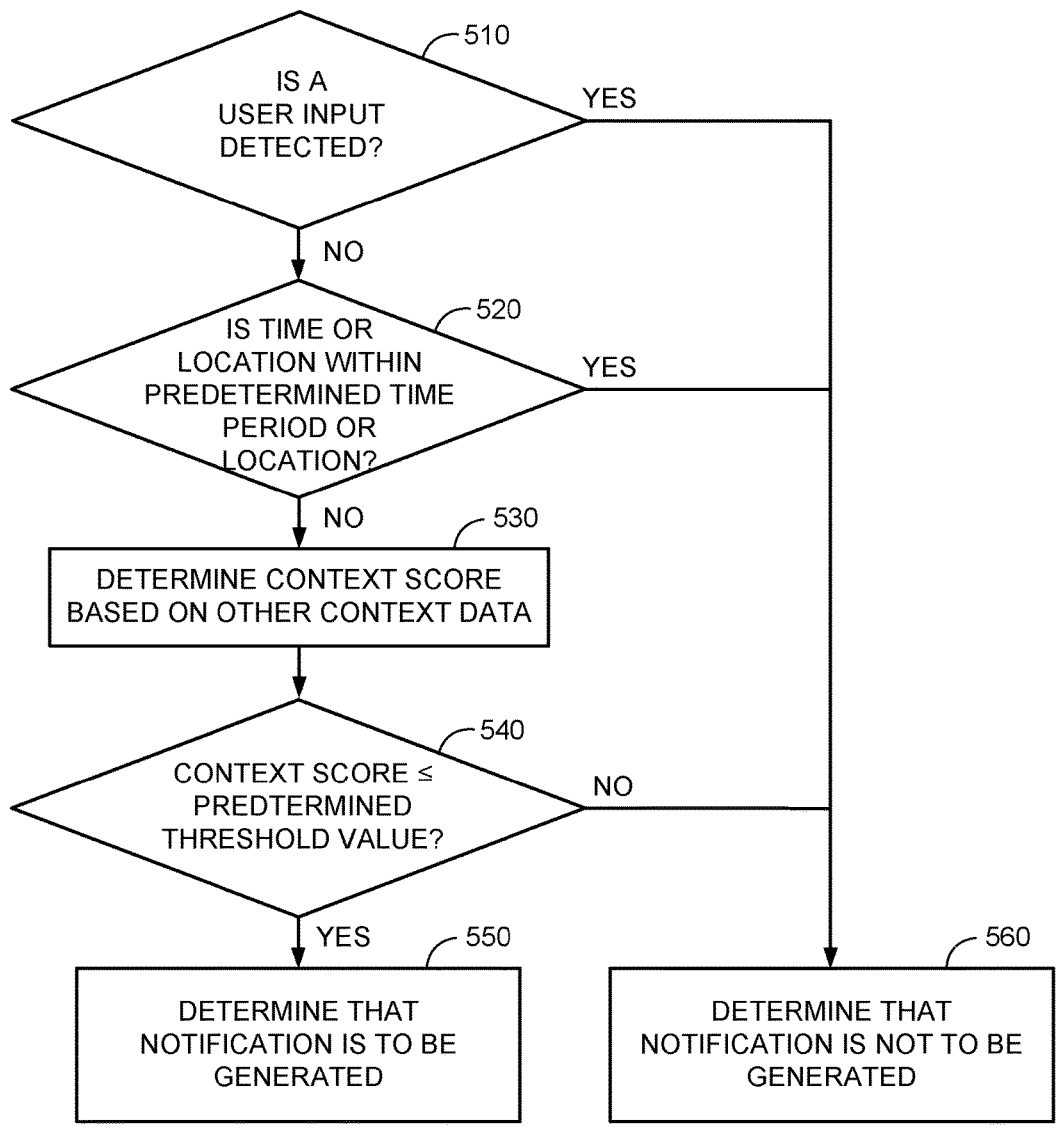
FIG. 5 illustrates a flowchart of a method performed by the notification processing unit in the processor for determining whether the notification is to be generated based on the context data, according to one embodiment of the present disclosure.

FIG. 5 illustrates a flowchart of a method performed by the notification processing unit 256 in the processor 250 for determining whether the notification is to be generated based on the context data, according to one embodiment of the present disclosure. For determining whether the notification is to be generated, the notification processing unit 256 may analyze and/or process context data from any one or more sensors or units in the sensor unit 210. In some embodiments, the notification processing unit 256 may assign a higher or highest priority to certain types of context data.

Initially, the notification processing unit 256 may determine at 510 whether a user input is detected in the context data received from the sensor unit 210. For example, the user input may indicate that the electronic device 120 is being used by or is accessible to the user 110. In one embodiment, if context data is determined to include the user input (e.g., manual input) at 510, the notification processing unit 256 may determine that no notification is to be generated at 560. Alternatively or additionally, the notification processing unit 256 may determine whether the electronic device 120 is being operated in response to a user input received as context data. For example, the electronic device 120 may be displaying video on a display of the electronic device 120 or playing a song in response to an input or command from the user 110. In this case, the notification processing unit 256 may determine that no notification is to be generated at 560.

On the other hand, if it is determined that no user input has been received at 510, the notification processing unit 256 may determine whether a current location or a current time of the electronic device 120 is within a predetermined location or a predetermined time, respectively, at 520. In some embodiments, the electronic device 120 may receive and store one or more time periods and/or locations for which the notification is not to be generated from the user 110. Upon determining that the current location or the current time of the electronic device is within a predetermined location or a predetermined time, respectively, the notification processing unit 256 may determine that the notification is not to be generated at 560. Otherwise, the notification processing unit 256 may proceed to determine a context score for generating the notification based on other types of context data at 530.

In one embodiment, the notification processing unit 256 may receive the current time as context data from the sensor unit 210 and determine whether the current time is within a predetermined time period during which the notification is not to be generated such as when the user 110 may be inactive (e.g., asleep, night time, etc.) or may not be able to access the electronic device 120 (e.g., during a meeting). The predetermined time period during which the notification is not to be generated may be determined based on usage history of the electronic device 120 or scheduled tasks in a calendar application of the electronic device. For example, the notification processing unit 256 may access the calendar application and determine that the current time is within a time period during which a meeting is scheduled at 520 and thus proceed to determine that no notification is to be generated at 560.

In another embodiment, the notification processing unit 256 may receive the current location of the electronic device 120 as context data from the sensor unit 210 and determine whether the current location corresponds to a predetermined location for which the notification is not to be generated. For example, the current location of the electronic device 120 may be determined to correspond to a location where the use of the electronic device 120 may be restricted such as a library, a theater, or the like. In this case, the notification processing unit 256 may proceed to determine that the notification is not to be generated at 560. Otherwise, the notification processing unit 256 may proceed to determine a context score for generating the notification based on other types of context data at 530.

At 530, the notification processing unit 256 may determine a context score based on one or more types of context data. As used herein, the term "context score" may be a probability value indicating whether the electronic device 120 is in a context in which the notification is to be generated. In one embodiment, the notification processing unit 256 may calculate a context score based on context data received from the sensor unit 210 and/or the processor 250. For example, the context data may include one or more types of context data other than the user input, the current location, and the current time. Alternatively, the context data may include all types of context data received from the sensor unit 210 and/or the processor 250.

In some embodiments, a context score may be determined based on the types of context data such as an ambient light value, an image of a user, an event indicative of an unacknowledged incoming communication, and/or a movement of the electronic device. Each of the types of context data may be represented with any suitable values, which may be weighted by an associated predetermined weight and combined to calculate the context score using any suitable weighting scheme. For example, a context score may be determined based on the context data, which may be weighted as shown in Table 1 below according to one embodiment of the present disclosure.

TABLE 1

| Context Data | Context Value | Weight | Weighted Context Value |
|---|---|---|---|
| Ambient Light | Intensity: 0.2 | 0.1 | 0.02 |
| Image of User | Image of User: 1 | 0.5 | 0.5 |
| Unacknowledged Incoming Communication | Elapsed time: 0.4 | 0.3 | 0.12 |
| Movement | Elapsed time: 0.8 | 0.1 | 0.08 |

In the case of ambient light in Table 1 above, the ambient light may be represented with a numerical context value in a range between 0 and 1 that may be proportional to the intensity of the light, where the value 0 may indicate a lowest intensity level (e.g., complete darkness) and the value 1 may indicate a highest intensity. For example, a low ambient light value may indicate that the electronic device 120 is covered by or located within an object (e.g., a plurality of books, paper, clothing, a pocket, etc.) and thus the user 110 may not be able to find the electronic device 120. In such a situation, a notification may be generated to alert the user 110 of the electronic device 120. In other cases, a low ambient light value may be a result of the time of the day such as evening time and may not be clearly indicative of whether the notification should be generated. Thus, in the illustrated embodiment in Table 1, a relatively low weight of 0.1 may be assigned to the ambient light having an intensity of 0.2 such that the notification processing unit 256 may determine a weighted context value of 0.02 for the ambient light value.

For the case of the image of the user 110, the image may be represented with a numerical context value of either 0 or 1 depending on whether the user 110 is recognized to be in the image. For example, when the user 110 is identified in the image received from the image sensor 310, the value of 1 may be assigned. Otherwise, the value of 0 may be assigned. If the user 110 is detected in the image received via the image sensor 310, it is highly likely that the user 110 can see the electronic device 120. Accordingly, a relatively high weight of 0.5 may be assigned to the image of the user 110 having a value of 1 in Table 1 so that the notification processing unit 256 may determine a weighted context value of 0.5 for the image.

In the case of the unacknowledged incoming communication in the electronic device 120, an event indicative of such incoming communication data may be represented with a numerical context value in a range between 0 and 1, which may be inversely proportional to an elapsed time since the receipt of the unacknowledged incoming communication. For example, upon receiving an event indicative of the unacknowledged incoming communication as context data, the notification processing unit 256 may determine how much time has elapsed since the unacknowledged incoming communication was received via the communication unit 230. When the event indicative of the unacknowledged incoming communication is received immediately upon receipt via the communication unit 230, the context value for the event may correspond to 1. On the other hand, when the elapsed time since the receipt of an unacknowledged incoming communication is longer than a predetermined threshold time period (e.g., 10 hours, a day, etc.), the context value for the event indicative of the unacknowledged incoming communication may correspond to 0. For an elapsed time between these cases, any suitable intermediate value may be assigned in inverse proportion to the elapsed time. In the illustrated embodiment, a value of 0.4 may be assigned for an elapsed time of six hours and a weight of 0.3 may be assigned to such an event such that the notification processing unit 256 may determine a weighted context value of 0.12 for the event indicative of the unacknowledged incoming communication.

For the case of the movement of the electronic device 120, movement data indicative of a movement of the electronic device 120 may be represented with a numerical context value in a range between 0 and 1, which may be inversely proportional to the elapsed time since the last or most recent movement of the electronic device 120. For example, if the current movement data received from the movement sensor 320 indicates movement of the electronic device 120, the elapsed time may be zero and the context value for the movement of the electronic device 120 may correspond to 1. On the other hand, if the current movement data indicated no movement of the electronic device, the notification processing unit 256 may determine how much time has elapsed since the last or most recent movement was detected based on a time that the last or most recent movement was detected. For example, when movement data indicating a movement of the electronic device 120 is received from the movement sensor 320, the processor 250 may store the time at which the movement of the electronic device 120 is detected in the storage unit 240. In this case, the notification processing unit 256 may access the time at which the last movement of the electronic device 120 was detected from the storage unit 240, and determine how much time has elapsed since the last movement was detected. If the elapsed time since the last or most recent movement of the electronic device 120 is longer than a predetermined threshold time period (e.g., 10 hours, a day, etc.), the context value for the movement of the electronic device 120 may be determined to be 0. For an elapsed time between zero and the predetermined threshold time period, any suitable intermediate value may be assigned in inverse proportion to the elapsed time. As shown in the illustrated embodiment, a value of 0.8 may be assigned for an elapsed time of two hours and a weight of 0.1 may be assigned to such movement data. In this case, the notification processing unit 256 may determine a weighted context value of 0.08 for the movement of the electronic device 120.

Upon generating a weighted context value for each of the types of context data in Table 1, the notification processing unit 256 may calculate a context score of 0.72 by adding the weighted context values. For example, a context score S may be determined according to the following equation $$S = \sum_{i=1}^{N} w_i v_i,$$

where $w_i$ and $v_i$ are a weight and a context value, respectively. Alternatively, a context score S may be determined according to any suitable function for determining the context score such as $S=(v_1, \ldots, v_N)$, where $v_i$ is a context value. Although the notification processing unit 256 determines the context score based on the types of context data shown in Table 1, it may also determine the context score based on other types of context data such as the user input, the current location, the current time, a direction from which the input sound is spoken (e.g., a direction of departure), and/or the like. In such a case, a high weight value may be assigned to each of such types of context data such that the context score may be determined substantially based on one or more of such types of context data.

With reference to FIG. 5, upon determining the context score, the notification processing unit 256 may compare the context score with a predetermined threshold score at 540. If the context score is less than or equal to the predetermined threshold score, the notification processing unit 256 may determine that notification is to be generated at 550. On the other hand, if the context score is determined to be greater than the predetermined threshold, the notification processing unit 256 may determine that the notification is not to be generated at 560. With reference to Table 1 above, given a predetermined threshold score of 0.5, the notification processing unit 256 may determine that the notification is not to be generated at 560 since the calculated context score of 0.72 is greater than or equal to the predetermined threshold score of 0.5. On the other hand, if a calculated context score is less than the threshold score, the notification processing unit 256 may determine that the notification is to be generated at 550.

In some embodiments, the notification processing unit 256 may determine whether to generate the notification additionally based on whether an input sound is spoken in a direction toward the electronic device 120, which may correspond to a direction toward the sound sensor 130. For example, the input sound may be a speech phrase spoken by the user 110 (e.g., a speech phrase indicative of a command to generate the notification), which is received by the electronic device 120 via the sound sensor 130. Upon receiving the input sound, the notification processing unit 256 may determine whether the input sound is spoken in a direction other than a direction toward the electronic device 120.

According to one embodiment, the notification processing unit 256 may determine a departure angle of the input sound from the user 110 as a "direction of departure" (DOD) of the input sound. In this case, the input sound may be determined to be spoken in a direction toward the electronic device 120 if the direction of departure of the input sound is in a direction along a line (e.g., a reference line or direction) between a sound source (e.g., a user) and the electronic device 120. Otherwise, the input sound may be determined to be spoken in a direction other than a direction toward the electronic device 120. Further, the notification processing unit 256 may also determine that a direction of departure of the input sound is toward the electronic device 120 when the direction is determined to be within a predetermined angle or range from the line between the electronic device 120 and the user 110.

Figure 6:
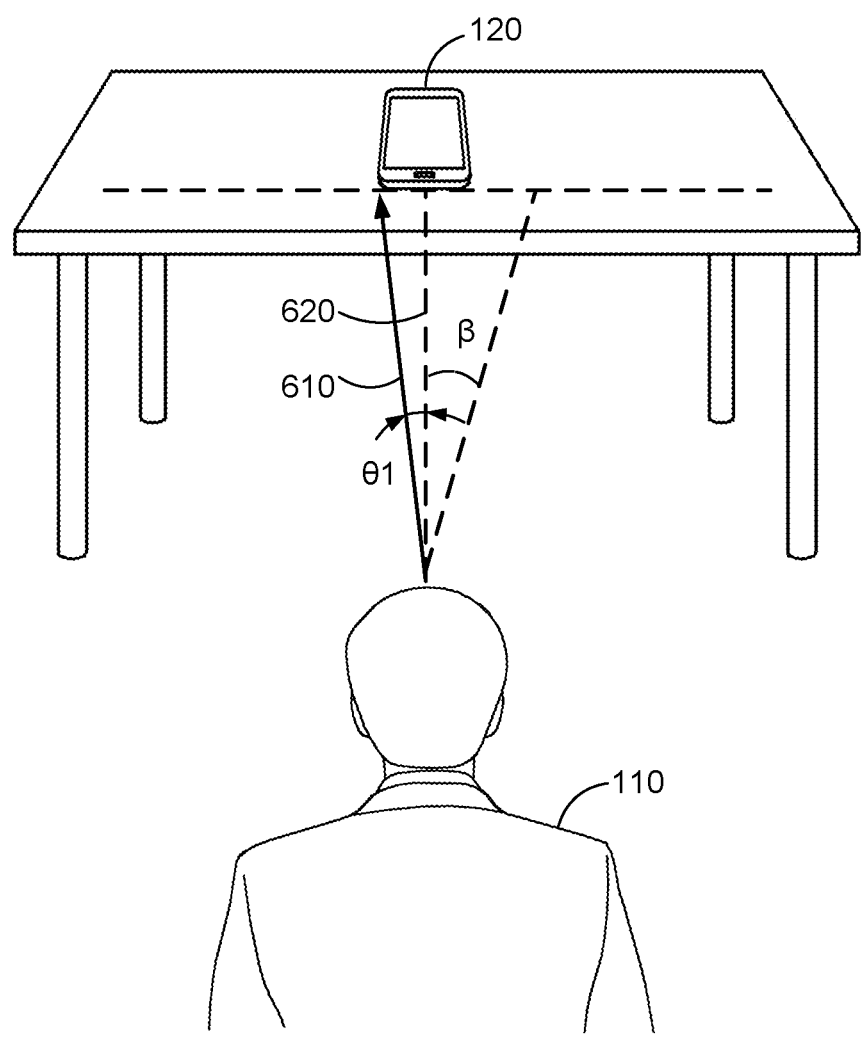
FIG. 6 illustrates an input sound spoken by the user in a direction toward the electronic device, according to one embodiment of the present disclosure.

FIG. 6 illustrates an input sound spoken by the user 110 in a direction toward the electronic device 120 according to one embodiment of the present disclosure. In the illustrated embodiment, the user 110 may speak a speech phrase as the input sound in a direction 610, which may deviate from a reference direction 620 toward the electronic device 120. Upon receiving the speech phrase as an input sound via the sound sensor 130, the notification processing unit 256 may determine a direction of departure 610 of the speech phrase, the reference direction 620 between the user 110 and the electronic device 120, and an angle $\theta_1$ between the directions 610 and 620. Given a predetermined angle $\beta$ within which an input sound may be considered to be spoken toward the electronic device 120, the notification processing unit 256 may determine that the angle $\theta_1$ is less than the predetermined angle $\beta$ and thus determine that the direction of departure 610 of the speech phrase is toward the electronic device 120.

Figure 7:
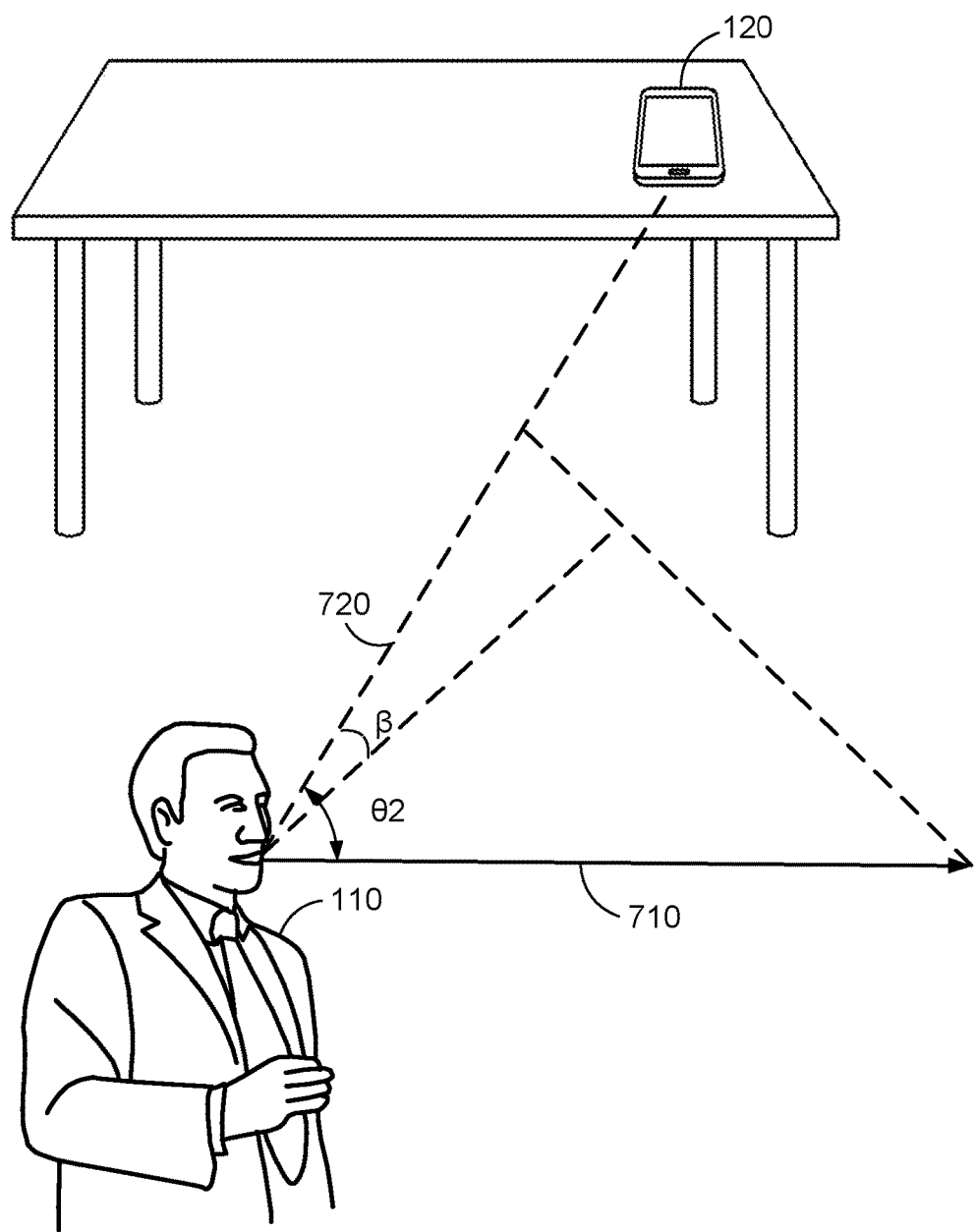
FIG. 7 illustrates an input sound spoken by the user in a direction other than a direction toward the electronic device, according to one embodiment of the present disclosure.

FIG. 7 illustrates an input sound spoken by the user 110 in a direction other than a direction toward the electronic device 120 according to one embodiment of the present disclosure. As shown in the illustrated embodiment, the user 110 may speak a speech phrase as the input sound in a direction 710, which may deviate from a reference direction 720 toward the electronic device 120. Upon receiving the speech phrase as an input sound via the sound sensor 130, the notification processing unit 256 may determine a direction of departure 710 of the speech phrase, the reference direction 720 between the user 110 and the electronic device 120, and an angle $\theta_2$ between the directions 710 and 720. Given the predetermined angle $\beta$ within which an input sound may be considered to be spoken toward the electronic device 120, the notification processing unit 256 may determine that the angle $\theta_2$ is greater than the predetermined angle $\beta$ and thus determine that the direction of departure 710 of the speech phrase is in a direction other than a direction toward the electronic device 120.

Figure 8:
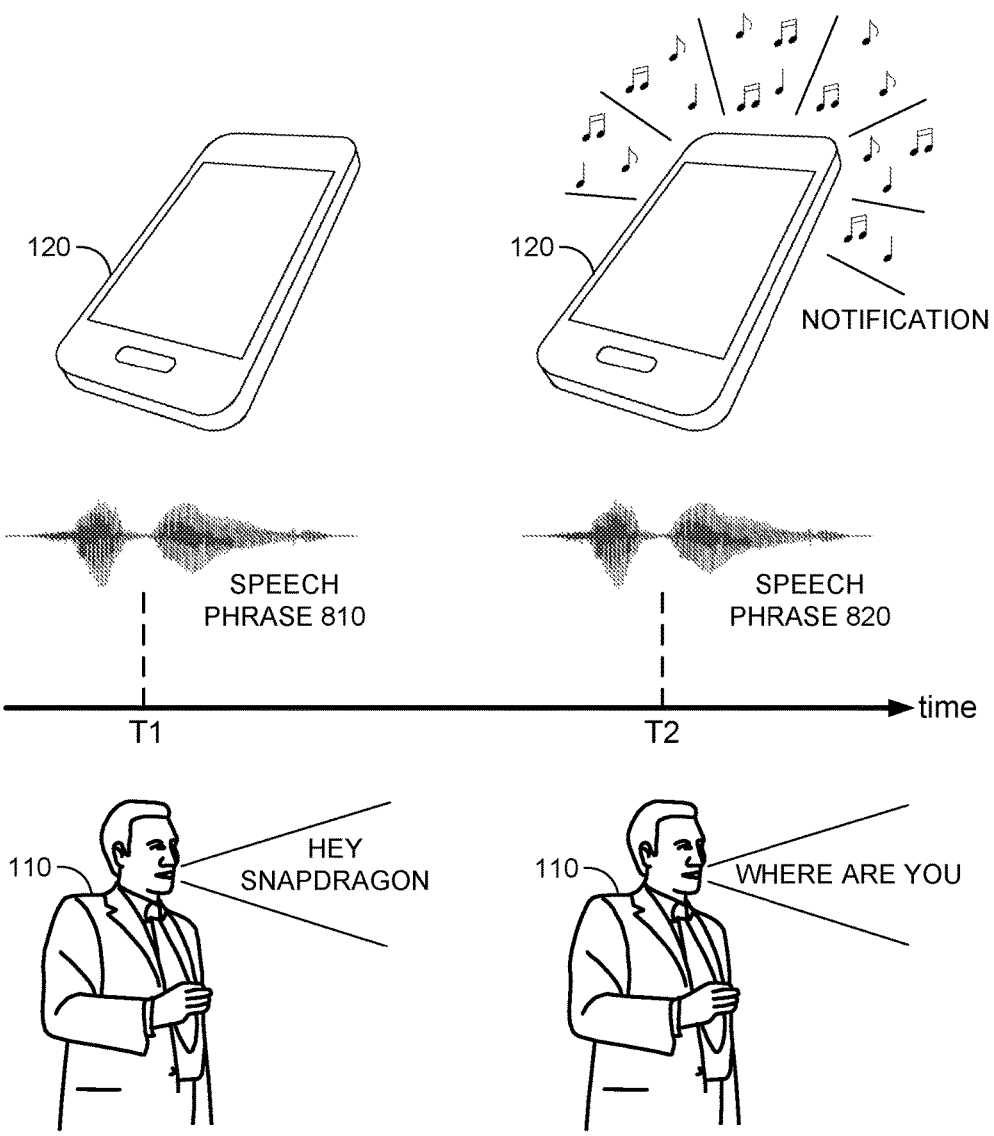
FIG. 8 illustrates recognizing a speech phrase as a command to generate the notification based on reception times of a first speech phrase and a second speech phrase, according to one embodiment of the present disclosure.

FIG. 8 illustrates recognizing a speech phrase as a command to generate the notification based on reception times of a first speech phrase 810 and a second speech phrase 820, according to one embodiment of the present disclosure. In the illustrated embodiment, the speech phrase may include the first speech phrase 810 as a command to activate the voice assistant unit 254 and the second speech phrase 820 as a command to generate the notification. Initially, the user 110 may speak the first speech phrase (e.g., "Hey Snapdragon") at time T1. The electronic device 120 may receive the first speech phrase via the sound sensor 130 and the speech recognition unit 252 may recognize the first speech phrase as a command to activate the voice assistant unit 254 in the processor 250 using any suitable speech recognition function. Upon recognizing the first speech phrase, the speech recognition unit 252 may activate the voice assistant unit 254.

At time T2, the user 110 may speak the second speech phrase (e.g., "Where are you"). The voice assistant unit 254, which has been activated, may receive the second speech phrase via the sound sensor 130 and recognize the second speech phrase as a command to generate the notification. Upon recognizing the second speech phrase as the command to generate the notification, the voice assistant unit 254 may determine whether the first speech phrase 810 and the second speech phrase 820 are received within a predetermined time period (e.g., 5 seconds) based on the reception times of the first and second speech phrases 810 and 820. Once the first speech phrase 810 and the second phrase 820 are determined to have been received within the predetermined time period, the voice assistant unit 254 may activate the notification processing unit 256 and provide the recognized command to the notification processing unit 256, which may determine whether to generate the notification. In one embodiment, the voice assistant unit 254 may be deactivated once it provides the recognized command to the notification processing unit 256.

According to some embodiments, the speech recognition unit 252 or the voice assistant unit 254 may recognize both of the first and second speech phrases 810 and 820. In one embodiment, the first and second speech phrases 810 and 820 may be received in any order or sequence and the speech recognition unit 252 and/or the voice assistant unit 254 may be configured to recognize the first and second speech phrases 810 and 820 in such order. For example, if the speech recognition unit 252 fails to receive or recognize the first speech phrase 810 but receives and recognizes the second speech phrase 820, the speech recognition unit 252 may then receive and recognize the first speech phrase 810 as a command to generate the notification.

Figure 9:
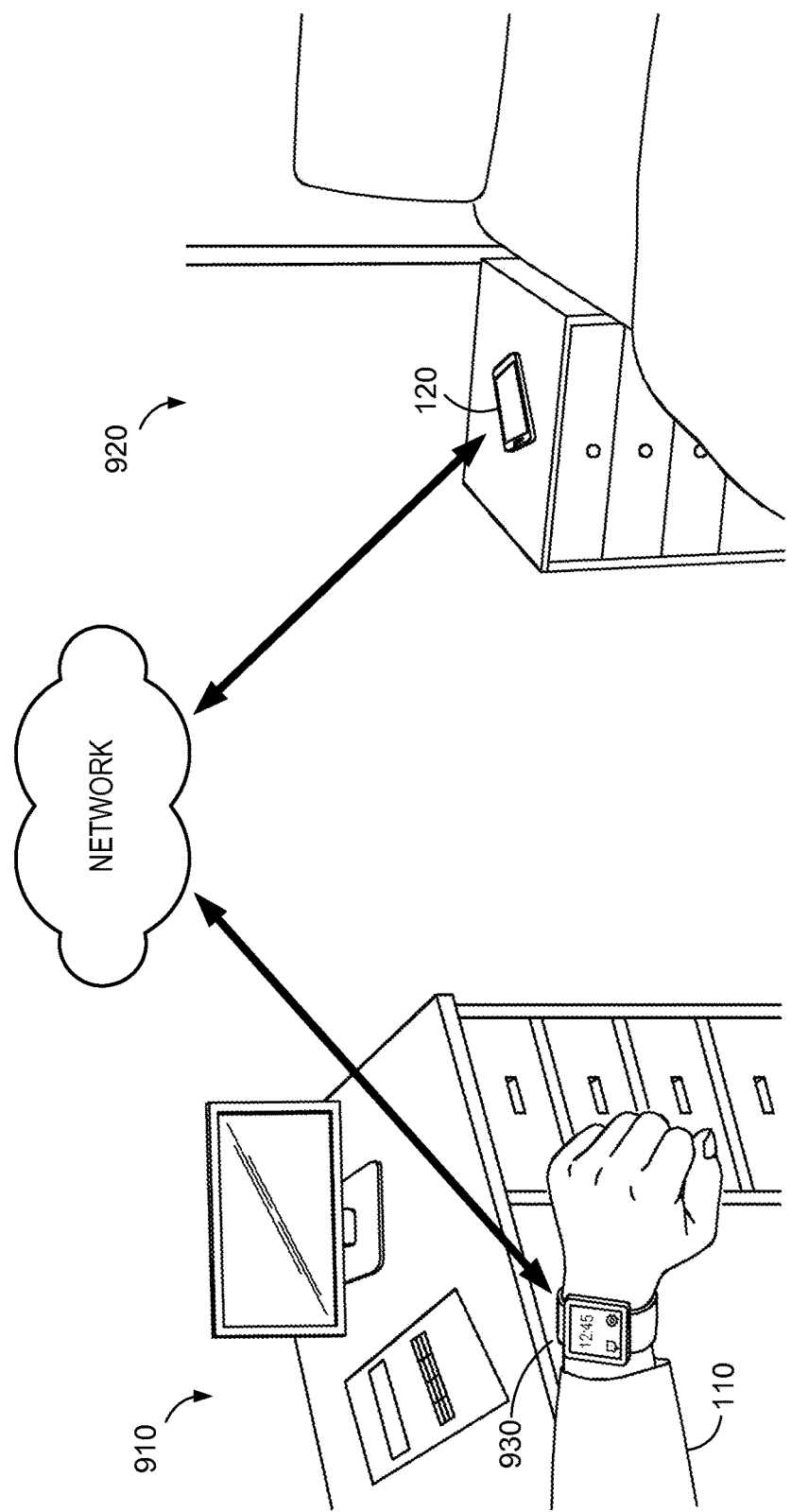
FIG. 9 illustrates the electronic device configured to transmit a notification including location information of the electronic device to an external device of the user, according to one embodiment of the present disclosure.

FIG. 9 illustrates the electronic device 120 configured to transmit a notification including location information of the electronic device to an external device 930 of the user 110, according to one embodiment of the present disclosure. As used herein, the term "external device" may be any electronic device that is physically separate from the electronic device 120 and capable of communicating wirelessly with the electronic device 120. As shown, the user 110 may be at a location 910 (e.g., an office) and the electronic device 120 may be at a location 920 (e.g., home) such that the electronic device 120 may not be able to receive or recognize a speech phrase spoken by the user 110.

In the illustrated embodiment, the user 110 may input a command (e.g., a speech phrase to generate a notification) to the external device 930 (e.g., a smartwatch, smart glasses, etc.) for locating the electronic device 120. In response, the external device 930 may wirelessly transmit a request to generate the notification, which may include the input speech phrase, to the electronic device 120. Upon receiving the request for the notification via the communication unit 230, the processor 250 in the electronic device 120 may receive location information from the location sensor 340 and wirelessly transmit the location information to the external device 930 via the communication unit 230. Alternatively or additionally, the processor 250 may receive any other types of context data indicative of a location of the electronic device (e.g., an image captured by the image sensor 310) via the sensor unit 210 or from the storage unit 240, and transmit such data as location information of the electronic device 120 to the external device 930. Additionally or alternatively, the electronic device 120 may output the notification via the output unit 220. In response to receiving the location information of the electronic device 120, the external device 930 may output the location information for the user 110.

Additionally or alternatively, the external device 930 may receive a speech phrase from the user 110 for locating the electronic device 120 and recognize the speech phrase as a command to locate the electronic device 120. In response to the recognized command, the external device 930 may transmit a request to generate a notification to the electronic device 120. Upon receiving the request, the electronic device 120 may transmit location information of the electronic device 120 to the external device 930. Additionally, the electronic device 120 may transmit any other types of context data of the electronic device 120 to the external device 930. In this case, the external device 930 may determine whether the notification is to be generated by the electronic device 120 based on the context data received from the electronic device 120. Upon determining that the notification is to be generated, the external device 930 may wirelessly transmit a command to generate the notification to the electronic device 120, which may generate and output the notification in response. In some embodiments, the external device 930 may be configured to detect context data of the external device 930 via one or more sensors. Based on the detected context data of the external device 930, the external device 930 may select one or more output units for outputting the location information of the electronic device 120 and output the location information via the selected output units for the user 110.

Figure 10:
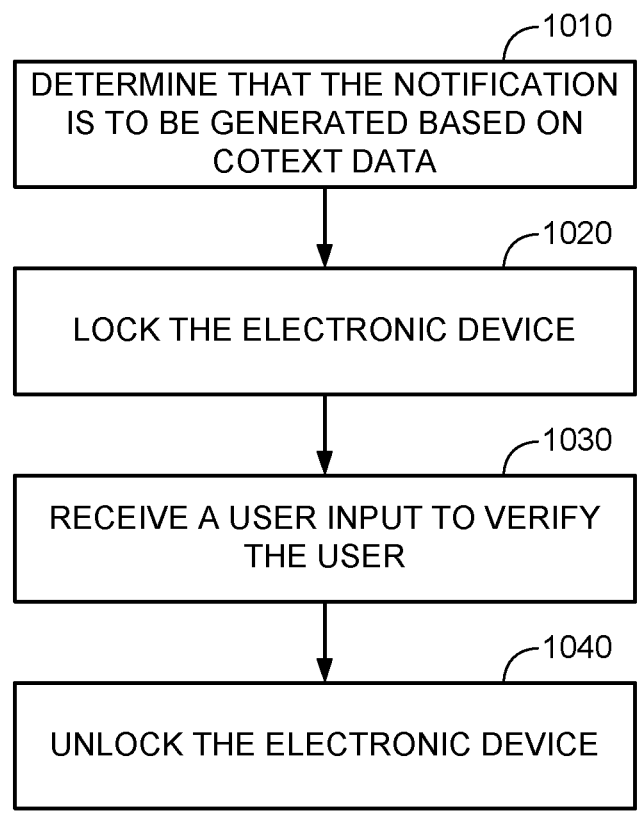
FIG. 10 illustrates a flowchart of a method performed by the processor for locking or unlocking the electronic device, according to one embodiment of the present disclosure.

FIG. 10 illustrates a flowchart of a method performed by the processor 250 for locking or unlocking the electronic device 120, according to one embodiment of the present disclosure. At 1010, the notification processing unit 256 may determine that the notification is to be generated based on context data. For example, the notification processing unit 256 in the processor 250 may determine that the notification is to be generated based on one or more types of context data, which may indicate that the electronic device 120 is likely to be inaccessible to the user 110 (e.g., lost or misplaced). In response to determining that the notification is to be generated, the processor 250 may lock the electronic device 120 at 1020 to prevent unauthorized access to the electronic device 120 by a user other than the user 110. At 1030, the processor 250 may receive a user input adapted to verify the user 110 such as a sound input, a predetermined pattern or image, a personal identification number, a password, a fingerprint, etc. via the input unit 350, the sound sensor 130, a fingerprint sensor, and/or the image sensor 310. In response to receiving and verifying the user input, the processor 250 may unlock the electronic device 120 at 1040. In one embodiment, when the electronic device 120 has been locked in response to determining that the notification is to be generated, the processor 250 may unlock the electronic device based on a type of user input with a high level of verification or authentication. For example, the processor 250 may not unlock the electronic device 120 in response to a passcode input and may require a fingerprint or a facial image as the user input to unlock the electronic device 120.

Figure 11:
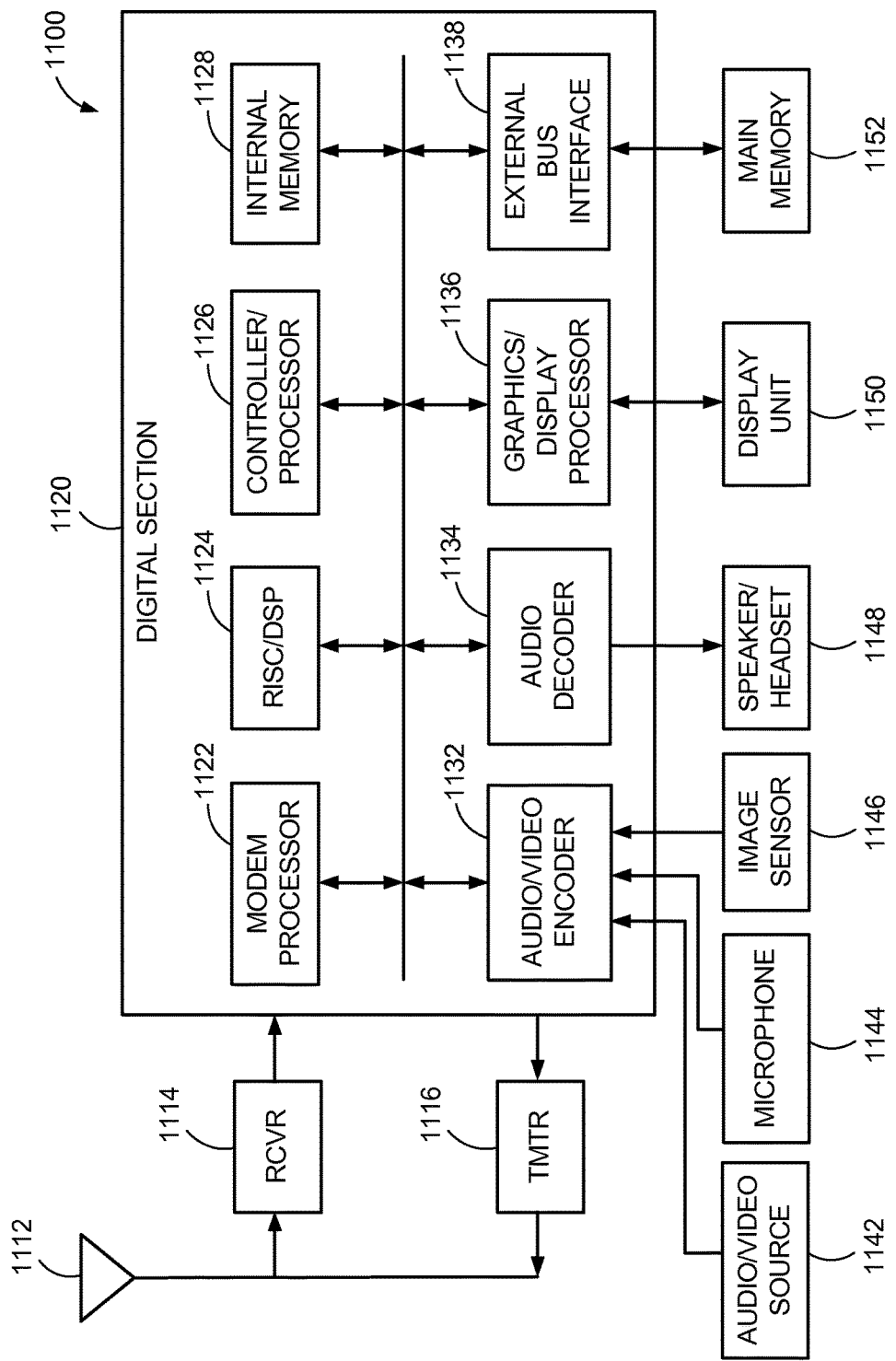
FIG. 11 is a block diagram of an exemplary electronic device in which the methods and apparatus for generating a notification based on the context data and the command to generate the notification may be implemented, according to one embodiment of the present disclosure.

FIG. 11 illustrates a block diagram of an electronic device 1100 in which the methods and apparatus of the present disclosure for generating a notification based on the context data and the command to generate the notification may be implemented according to some embodiments. The electronic device 1100 may be a cellular phone, a smartphone, a wearable computer, a smart watch, smart glasses, a tablet personal computer, a terminal, a handset, a personal digital assistant (PDA), a cordless phone, a tablet, and so on. The wireless communication system may be a CDMA system, a GSM system, a W-CDMA system, a LTE system, a LTE Advanced system, and so on.

The electronic device 1100 may be capable of providing bidirectional communication via a receive path and a transmit path. On the receive path, signals transmitted by base stations may be received by an antenna 1112 and may be provided to a receiver (RCVR) 1114. The receiver 1114 may condition and digitize the received signal, and provide the conditioned and digitized digital signal to a digital section for further processing. On the transmit path, a transmitter (TMTR) 1116 may receive data to be transmitted from a digital section 1120, process and condition the data, and generate a modulated signal, which is transmitted via the antenna 1112 to the base stations. The receiver 1114 and the transmitter 1116 may be part of a transceiver that may support CDMA, GSM, W-CDMA, LTE, LTE Advanced, and so on.

The digital section 1120 may include various processing, interface, and memory units such as, for example, a modem processor 1122, a reduced instruction set computer/digital signal processor (RISC/DSP) 1124, a controller/processor 1126, an internal memory 1128, a generalized audio/video encoder 1132, a generalized audio decoder 1134, a graphics/display processor 1136, and an external bus interface (EBI) 1138. The modem processor 1122 may perform processing for data transmission and reception, e.g., encoding, modulation, demodulation, and decoding. The RISC/DSP 1124 may perform general and specialized processing for the electronic device 1100. The controller/processor 1126 may perform the operation of various processing and interface units within the digital section 1120. The internal memory 1128 may store data and/or instructions for various units within the digital section 1120.

The generalized audio/video encoder 1132 may perform encoding for input signals from an audio/video source 1142, a microphone 1144, an image sensor 1146, etc. The generalized audio decoder 1134 may perform decoding for coded audio data and may provide output signals to a speaker/headset 1148. The graphics/display processor 1136 may perform processing for graphics, videos, images, and texts, which may be presented to a display unit 1150. The EBI 1138 may facilitate transfer of data between the digital section 1120 and a main memory 1152.

The digital section 1120 may be implemented with one or more processors, DSPs, microprocessors, RISCs, etc. The digital section 1120 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media. For example, a computer-readable storage medium may be a non-transitory computer-readable storage device that includes instructions that are executable by a processor. Thus, a computer-readable storage medium may not be a signal.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

<Aspects of the Present Disclosure>

Hereinafter, some aspects of the present disclosure will be additionally stated.

Example 1

According to an aspect of the present disclosure, there is provided a method for generating a notification by an electronic device, comprising: receiving a speech phrase; recognizing, by a processor, the speech phrase as a command to generate the notification; detecting, by at least one sensor, context data of the electronic device; and generating, by the processor, the notification based on the context data and the command.

Example 2

In the method of Example 1, detecting the context data is at least based on one among a user input, movement of the electronic device, timing information, location information of the electronic device, ambient light value, and an input sound.

Example 3

In the method of Example 2, generating the notification comprises determining whether the notification is to be generated at least based on the context data.

Example 4

In the method of Example 3, determining whether the notification is to be generated comprises deactivating a silent mode of the electronic device upon determining that the notification is to be generated.

Example 5

In the method of Example 3, determining whether the notification is to be generated comprises determining that the notification is not to be generated upon detecting that the context data includes the user input.

Example 6

In the method of Example 4, determining whether the notification is to be generated comprises at least one of: determining whether the timing information is within a predetermined time period during which the notification is not to be generated; or determining whether the location information of the electronic device corresponds to a predetermined location where the notification is not to be generated.

Example 7

In the method of Example 1, receiving a speech phrase comprises receiving, by a sound sensor, a first speech phrase and a second speech phrase, and recognizing the speech phrase as a command to generate the notification comprises recognizing the speech phrase as the command to generate the notification in response to determining that the first speech phrase and the second speech phrase are received within a predetermined time period.

Example 8

In the method of Example 7, recognizing the speech phrase as a command to generate the notification comprises recognizing the first speech phrase as a command to activate a voice assistant unit in the electronic device and the second speech phrase as the command to generate the notification.

Example 9

In the method of Example 1, receiving a speech phrase comprises receiving, by a communication unit, the speech phrase from an external device, and generating the notification comprises transmitting, by the communication unit, location information of the electronic device to the external device.

Example 10

The method of Example 4 further includes locking the electronic device to prevent unauthorized access to the electronic device in response to determining that the notification is to be generated.

Example 11

The method of Example 10 further includes unlocking the electronic device in response to receiving a user input.

Example 12

The method of Example 1, generating the notification comprises generating, by an output unit, at least one of audible sound, vibration, or visible light indicative of the notification.

Example 13

According to an aspect of the present disclosure, there is provided an electronic device for generating a notification, comprising: a sound sensor configured to receive a speech phrase; a speech recognition unit configured to recognize the speech phrase as a command to generate the notification; a sensor unit configured to detect context data of the electronic device; and a processor configured to generate the notification based on the context data and the command.

Example 14

The electronic device of Example 13 further includes an output unit configured to generate at least one of audible sound, vibration, or visible light indicative of the notification.

Example 15

In the electronic device of Example 13, the sensor unit is further configured to detect the context data at least based on one among a user input, movement of the electronic device, timing information, location information of the electronic device, ambient light value, and an input sound.

Example 16

In the electronic device of Example 15, the processor further comprises a notification processing unit configured to determine whether the notification is to be generated at least based on the context data.

Example 17

In the electronic device of Example 16, the notification processing unit is further configured to determine whether the notification is to be generated based on at least one of: determining that the notification is not to be generated upon detecting that the context data includes the user input; determining whether the timing information is within a predetermined time period during which the notification is not to be generated; or determining whether the location information of the electronic device corresponds to a predetermined location where the notification is not to be generated.

Example 18

In the electronic device of Example 13, the sound sensor is further configured to receive a first speech phrase and a second speech phrase as the speech phrase, and the speech recognition unit is further configured to recognize the speech phrase as a command to generate the notification in response to determining that the first speech phrase and the second speech phrase are received within a predetermined time period.

Example 19

The electronic device of Example 18 further includes a voice assistant unit, where the speech recognition unit is further configured to recognize the first speech phrase as a command to activate the voice assistant unit and the voice assistant unit is configured to recognize the second speech phrase as the command to generate the notification.

Example 20

The electronic device of Example 13 further includes a communication unit configured to receive the speech phrase from an external device and transmit location information of the electronic device to the external device.

Example 21

In the electronic device of Example 16, the electronic device is further configured to perform at least one of: locking the electronic device to prevent unauthorized access to the electronic device in response to determining that the notification is to be generated; or unlocking the electronic device in response to receiving a user input.

Example 22

A non-transitory computer-readable storage medium comprising instructions causing at least one processor of an electronic device to perform operations of: receiving a speech phrase; recognizing the speech phrase as a command to generate the notification; detecting, via at least one sensor, context data of the electronic device; and generating the notification based on the context data and the command.

Example 23

In the non-transitory computer-readable storage medium of Example 22, detecting the context data is at least based on one among a user input, movement of the electronic device, timing information, location information of the electronic device, ambient light value and an input sound.

Example 24

In the non-transitory computer-readable storage medium of Example 23, generating the notification comprises determining whether the notification is to be generated at least based on the context data.

Example 25

In the non-transitory computer-readable storage medium of Example 24, determining whether the notification is to be generated comprises at least one of: determining that the notification is not to be generated upon detecting that the context data includes the user input; determining whether the timing information is within a predetermined time period during which the notification is not to be generated; or determining whether the location information of the electronic device corresponds to a predetermined location where the notification is not to be generated.

Example 26

In the non-transitory computer-readable storage medium of Example 22, receiving, via a sound sensor, a speech phrase comprises receiving a first speech phrase and a second speech phrase, and recognizing the speech phrase as a command to generate the notification comprises recognizing the speech phrase as the command to generate the notification in response to determining that the first speech phrase and the second speech phrase are received within a predetermined time period.

Example 27

In the non-transitory computer-readable storage medium of Example 26, recognizing the speech phrase as a command to generate the notification comprises recognizing the first speech phrase as a command to activate a voice assistant unit in the electronic device and the second speech phrase as the command to generate the notification.

Example 28

In the non-transitory computer-readable storage medium of Example 22, receiving a speech phrase comprises receiving, via a communication unit, the speech phrase from an external device, and generating the notification comprises transmitting, via the communication unit, location information of the electronic device to the external device.

Example 29

The non-transitory computer-readable storage medium of Example 24 further includes instructions causing the at least one processor of the electronic device to perform at least one operation of: locking the electronic device to prevent unauthorized access to the electronic device in response to determining that the notification is to be generated; or unlocking the electronic device in response to receiving a user input.

Example 30

In the non-transitory computer-readable storage medium of Example 22, generating the notification comprises generating, via an output unit, at least one of audible sound, vibration, or visible light indicative of the notification.

What is claimed:

1. A method for generating a notification by an electronic device, comprising:
    receiving a speech phrase;
    recognizing, by a processor, the speech phrase as a command to generate the notification;
    detecting, by at least one sensor, context data of the electronic device;
    determining a context score associated with the context data;
    determining, by the processor, whether to generate the notification at least based on a comparison of the context score to a threshold value; and
    generating the notification based on the comparison.

2. The method of claim 1, wherein detecting the context data is at least based on one among a user input, movement of the electronic device, timing information, location information of the electronic device, an ambient light value, and an input sound.

3. The method of claim 2, wherein determining whether to generate the notification comprises determining whether the location information of the electronic device corresponds to a location where the notification is not to be generated.

4. The method of claim 1, wherein determining whether to generate the notification comprises deactivating a silent mode of the electronic device upon determining that the notification is to be generated.

5. The method of claim 1, wherein determining whether to generate the notification comprises determining whether the context data includes a user input.

6. The method of claim 2, wherein determining whether to generate the notification comprises determining whether the timing information is outside of a particular time period.

7. The method of claim 1, wherein receiving a speech phrase comprises receiving, by a sound sensor, a first speech phrase and a second speech phrase, and
    wherein the speech phrase is recognized as a command to generate the notification in response to determining that the first speech phrase and the second speech phrase are received within a predetermined time period.

8. The method of claim 7, wherein recognizing the speech phrase as a command to generate the notification comprises recognizing the first speech phrase as a command to activate a voice assistant unit in the electronic device and the second speech phrase as the command to generate the notification.

9. The method of claim 1, wherein receiving a speech phrase comprises receiving, by a communication unit, the speech phrase from an external device, and
    wherein generating the notification comprises transmitting, by the communication unit, location information of the electronic device to the external device.

10. The method of claim 4, further comprising locking the electronic device in response to determining that the notification is to be generated or unlocking the electronic device in response to receiving a user input.

11. The method of claim 10, further comprising:
    determining a context value for the context data; and
    calculating the context score by multiplying the context value by a weight value.

12. The method of claim 1, wherein generating the notification comprises generating, by an output unit, at least one of audible sound, vibration, or visible light indicative of the notification.

13. An electronic device for generating a notification, comprising:
    a sound sensor configured to receive a speech phrase;
    a speech recognition unit configured to recognize the speech phrase as a command to generate the notification;
    a sensor unit configured to detect context data of the electronic device;
    a processor configured to determine a context score associated with the context data and to determine whether to generate the notification at least based on a comparison of the context score to a threshold value; and
    an output unit configured to generate the notification based on the comparison.

14. The electronic device of claim 13, wherein the output unit is configured to generate at least one of audible sound, vibration, or visible light.

15. The electronic device of claim 13, wherein the sensor unit is further configured to detect the context data at least based on one among a user input, movement of the electronic device, timing information, location information of the electronic device, an ambient light value, and an input sound.

16. The electronic device of claim 15, wherein the processor is further configured to:
    determine a context value for the context data; and
    calculate the context score by multiplying the context value by a weight value.

17. The electronic device of claim 15, wherein the processor is further configured to determine whether to generate the notification based on at least one of:
    determining that the notification is not to be generated upon detecting that the context data includes the user input;
    determining whether the timing information is outside of a particular time period; or
    determining whether the location information of the electronic device corresponds to a location where the notification is not to be generated.

18. The electronic device of claim 13,
    wherein the sound sensor is further configured to receive a first speech phrase and a second speech phrase as the speech phrase, and
    wherein the speech recognition unit is further configured to recognize the speech phrase as a command to generate the notification in response to determining that the first speech phrase and the second speech phrase are received within a predetermined time period.

19. The electronic device of claim 18, further comprising a voice assistant unit,
    wherein the speech recognition unit is further configured to recognize the first speech phrase as a command to activate the voice assistant unit, and
    wherein the voice assistant unit is configured to recognize the second speech phrase as the command to generate the notification.

20. The electronic device of claim 13, further comprising:
a communication unit configured to transmit location information of the electronic device to an external device.

21. The electronic device of claim 16, wherein the electronic device is further configured to perform at least one of:
locking the electronic device in response to determining that the notification is to be generated; or
unlocking the electronic device in response to receiving a user input.

22. A non-transitory computer-readable storage medium comprising instructions executable to cause at least one processor of an electronic device to perform operations of:
receiving a speech phrase;
recognizing the speech phrase as a command to generate a notification;
detecting, via at least one sensor, context data of the electronic device;
determining a context score associated with the context data;
determining whether to generate the notification at least based on a comparison of the context score to a threshold value; and
generating the notification based on the comparison.

23. The non-transitory computer-readable storage medium of claim 22, wherein detecting the context data is at least based on one among a user input, movement of the electronic device, timing information, location information of the electronic device, an ambient light value and an input sound.

24. The non-transitory computer-readable storage medium of claim 23, further comprising:
determining a context value for the context data; and
calculating the context score by multiplying the context value by a weight value.

25. The non-transitory computer-readable storage medium of claim 23, wherein determining whether to generate the notification comprises at least one of:
determining that the notification is not to be generated upon detecting that the context data includes the user input;
determining whether the timing information is outside of a particular time period; or
determining whether the location information of the electronic device corresponds to a location where the notification is not to be generated.

26. The non-transitory computer-readable storage medium of claim 22, wherein receiving, via a sound sensor, a speech phrase comprises receiving a first speech phrase and a second speech phrase, and
wherein the speech phrase is recognized as the command to generate the notification in response to determining that the first speech phrase and the second speech phrase are received within a predetermined time period.

27. The non-transitory computer-readable storage medium of claim 26, wherein the first speech phrase comprises a command to activate a voice assistant unit in the electronic device and the second speech phrase comprises the command to generate the notification.

28. The non-transitory computer-readable storage medium of claim 22, wherein generating the notification comprises transmitting, via a communication unit, location information of the electronic device to an external device.

29. The non-transitory computer-readable storage medium of claim 24, further comprising instructions executable to cause the at least one processor of the electronic device to perform at least one operation of:
locking the electronic device in response to determining that the notification is to be generated; or
unlocking the electronic device in response to receiving a user input.

30. The non-transitory computer-readable storage medium of claim 22, wherein generating the notification comprises generating, via an output unit, at least one of audible sound, vibration, or visible light indicative of the notification.

* * * * *